J. W. Barnum.
Cotton-Bale Tie.

Nº 76146    Patented Mar. 31, 1868.

Witnesses.
A. Paibasm
Rufus R. Rhodes

Inventor
James W. Barnum

United States Patent Office.

JAMES W. BARNUM, OF NEW ORLEANS, LOUISIANA.

Letters Patent No. 76,146, dated March 31, 1868.

IMPROVED COTTON-BALE TIE.

*The Schedule referred to in these Letters Patent and making part of the same.*

TO ALL WHOM IT MAY CONCERN:

Be it known that I, JAMES W. BARNUM, of the city of New Orleans, parish of Orleans, and State of Louisiana, have invented a certain new, useful, and improved device for fastening the ends of wire rope or wire, as the case may be, when the same is used for banding bales of cotton or other substance; and I do hereby declare the following to be a full, clear, and exact description of the same, reference being had to the annexed drawings, making a part of this specification, in which—

Figure 1:
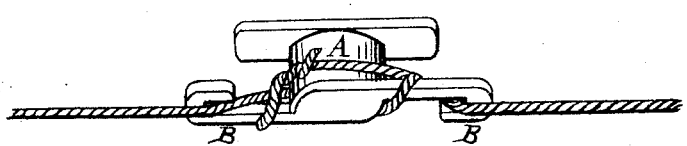
Figure 2:
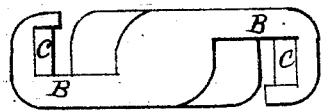

Figure 1, a perspective view, in which is shown the mode of fastening the device to the ends of a wire-rope band, and thus of securing the said ends together; and Figure 2 is a side view of the device.

Figure 3:
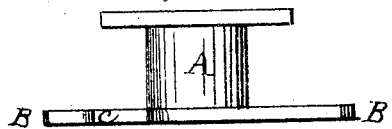

Figure 3, a top view of the device as when it is disconnected from a band.

My invention looks to the taking up of the slack of the band, and to securing the ends together without a key or other supplementary device; and it consists of a cylinder about three-fourths of an inch in diameter, that is provided with projecting plates at each of its ends, the projection being in the same plane, but in opposite directions, and extending an inch and a half, more or less, from the perimeter of the cylinder, which plates are notched upon their upper edges, and near their outer ends, in order that when the slack is taken up, the fastening may be established, by slipping the wire rope in the same, as shown on the drawings at fig. 2.

Figure 4:

An obvious modification of my device would be to turn the notched ends of the two projecting arms at right angles to the line of the direction of the said arms, or in such a manner as to make them parallel to the cylinders, as is clearly shown at Figure 4.

The device may be made of cast or malleable iron.

On the drawings, the cylinder is marked A, the projecting plates B B', and the notches C C'.

The operation of my invention in actual practice is: The wire rope being first put around the bale, and cut to a proper length to encircle the cylinder with the ends of the same, the coil being in opposite directions as to the two ends, and then to turn or roll the device until all the slack of the band has been taken up. When this has been done, the two parts on the reverse sides of the device on which the tension bears, are slipped into the notches, and the fastening is thus secured.

Having thus described my invention, as well as its mode of application or operation, what I claim, and desire to secure by Letters Patent, as a new article of manufacture, is—

The cylinder A, when provided with the two projecting plates B B', in which are cut the notches C, as herein described, for the purpose set forth.

JAMES W. BARNUM.

Witnesses:
 A. BARBARIN,
 RUFUS R. RHODES.